United States Patent
Mooring et al.

(10) Patent No.: US 8,260,883 B2
(45) Date of Patent: Sep. 4, 2012

(54) FILE SHARING BETWEEN DEVICES

(75) Inventors: David J. Mooring, Los Altos Hills, CA (US); Matthew G. Pallakoff, Mountain View, CA (US)

(73) Assignee: WIMM Labs, Inc., Los Altos, CA (US)

( * ) Notice: Subject to any disclaimer, the term of this patent is extended or adjusted under 35 U.S.C. 154(b) by 635 days.

(21) Appl. No.: 12/416,797

(22) Filed: Apr. 1, 2009

(65) Prior Publication Data
US 2010/0257251 A1    Oct. 7, 2010

(51) Int. Cl.
*G06F 15/16* (2006.01)
*G06F 3/041* (2006.01)
*H04K 1/00* (2006.01)

(52) U.S. Cl. .................. 709/219; 345/173; 380/270

(58) Field of Classification Search .............. 709/219; 380/270; 345/173
See application file for complete search history.

(56) References Cited

U.S. PATENT DOCUMENTS

| | | | |
|---|---|---|---|
| 6,327,613 B1* | 12/2001 | Goshey et al. | 709/208 |
| 6,591,279 B1* | 7/2003 | Emens et al. | 1/1 |
| 7,558,840 B1* | 7/2009 | Howard et al. | 709/219 |
| 2005/0015466 A1* | 1/2005 | Tripp | 709/219 |
| 2007/0003061 A1* | 1/2007 | Jung et al. | 380/270 |
| 2007/0146347 A1* | 6/2007 | Rosenberg | 345/173 |
| 2008/0172718 A1* | 7/2008 | Bradley | 726/1 |
| 2008/0228899 A1* | 9/2008 | Plamondon | 709/219 |
| 2009/0128506 A1* | 5/2009 | Nurmi | 345/173 |
| 2009/0141899 A1* | 6/2009 | Huang et al. | 380/270 |

OTHER PUBLICATIONS

Rene Mayrhofer and Hans Gellersen "Shake Well Before Use: Authentication Based on Accelerometer Data", Pervasive 2007, LNCS 4480, pp. 144-161, 2007.*
Ken Hinckley "Synchronous Gestures for Multiple Persons and Computers", ACM 1-58113-636-06/03/0010, vol. 5, Issue 2, 2003.*
Lars Erik Holmquist, Friedemann Mattern, Bernt Schiele, Petteri Alahuhta, Michael Beigl and Hans-W. Gellersen "Smart-Its Friends: A Technique for Users to Easily Establish Connections between Smart Artefacts", Ubicomp 2001, LNCS 2201, pp. 116-122, 2001.*
Bump for iPhone and iPod Touch, Bump Technologies, http://bumptechnologies.com/products.phtml, Mar. 1, 2009.
Apple iTunes Store, Bump Technologies LLC, Social Networking Application, Mar. 27, 2009.
Fliq, It's Slick. It's Quick. It's Fliq!, http://www.markspace.com/products/fliq/fliq-iphone-overview.html, Dec. 20, 2008.

* cited by examiner

*Primary Examiner* — Boris Gorney
(74) *Attorney, Agent, or Firm* — Convergent Law Group LLP

(57) ABSTRACT

Methods and systems for transferring an object from a sending device to a recipient comprises determining at least one catching device associated with the recipient for receiving the object; receiving on the sending device a user gesture representing a flick of a displayed object; transferring the object from the sending device directly to the catching device of the recipient when the catching device is in proximity of the sending device; and when the catching device is not in proximity of the sending device, transferring the object to a server for forwarding the object to the recipient.

14 Claims, 5 Drawing Sheets

FILE SHARING BETWEEN DEVICES

BACKGROUND OF THE INVENTION

File sharing has been a feature of networked computer systems for many years. One form of file sharing is the peer-to-peer (P2P) model, where the files are stored on and served by personal computers of the users. Some P2P file sharing networks over the Internet utilize a centralized server system that controls traffic among the peer nodes (e.g., the PCs). The central server(s) maintain a central directory of the shared files on the peer nodes, which is updated as each user logs on. Using his or her own peer, a user submits search criteria at the central server, and in response, the server sends back a list of peers that have the data. Once the user selects a peer from the list, the selected peers sends the data to the user's computer. Napster™ is an example of a popular centralized P2P. Another type of P2P network operates without a central server, and instead, some of the peers operate as indexing nodes that keep track of the files stored on the peer nodes. Two examples of decentralized P2P networks include Gnutella™ and Kazaa™. A recent incarnation of P2P networks may transmit streams instead of files over the P2P network.

One disadvantage of P2P networks is that the peer nodes must download and install the same client application that enables the devices to become peer nodes. A peer running a client application of one brand of P2P network cannot search for and download files hosted on a peer running a client application from another P2P network brand. Therefore, file sharing in a P2P network is tied to the P2P software provider. Another disadvantage is that while P2P networks allow users to easily select and download files, little or no provisions are provided for enabling a user to initiate a file transfer to another user.

In recent years, filing sharing has migrated from the PC to handheld devices, such as personal digital assistants (PDAs) and cell phones. For example, file sharing has gained popularity on PDAs and cell phones that run the Palm™ operating system (OS) through the use of infrared (IR) beaming. The IR port on handled devices may be used to exchange information between any two IR-equipped devices, wirelessly. The Palm OS, for example, supports the sending of applications, and address, to do list, and memo pad items. When the receiving device receives a beam, the data is automatically stored in the corresponding application on the device. For example, sharing business card information with another device results in the information being automatically added to the other device's address book.

One disadvantage of file sharing using IR beaming is limited range because the sending and receiving devices must be within a few feet of each other for the file sharing to work. With IR beaming in particular, the two devices must be in line-of-sight before the communication can occur, and both devices must run the same software that controls the transfer, e.g., the Palm OS.

Bluetooth is a wireless personal area network (WPAN) standard that also may be used to transmit digital voice and data between devices. However, Bluetooth suffers from short range and limited bandwidth. Although Bluetooth provides a user with the advantage of being able to electronically send a file to another user when there is no network available, Bluetooth requires the user to go through the steps of setting up an ad hoc, wireless network so that the two devices can be paired.

A more recent type of file sharing allows a user of one device to instantly send, or "beam", photos and contacts to the devices of other users that are available on the same Wi-Fi network, providing that each of the devices is running the same file sharing application. An example is a free file sharing application called Fliq™ offered by Mark/Space, Inc. for the Apple iPhone, ipod Touch, Mac, and Windows PC.

In operation, once the application is launched on a device, the application displays a list of nearby devices on the same network that are also running the application. The devices may be displayed with the nicknames their users assigned the device, e.g., "Mark's phone." The user then chooses a person they want to send to from the list. The user then picks a contact or a photo to send, and initiates a file transfer by swiping his or her finger across the touchscreen display. The contact or photo is then sent to the device of the chosen person in real time.

DropCopy and Mobile DropCopy by 10base-t Interactive™ is another application that allows transfer of data between iPhones and Macs available on the same network. DropCopy includes a file navigation interface that displays file types the application can preview with an eye icon. To send the file, the user taps on the filename, then selects the destination for the file from a list of devices currently on the network.

Although applications such as Fliq and DropCopy have enjoyed some popularity, the applications have drawbacks. For example, one drawback is that for applications to work, the sender and his or her friends must be on the same WiFi network, and the same application must be running on all of the friend devices. If a friend moves outside the WiFi zone, no transfer is possible.

Another drawback is that the type of files that can be transferred is limited. For example, Fliq on the iPhone limits users to transferring contact cards and photos. File types, such as PDF files are currently unsupported. Although DropCopy allows a user to send any file or folder, not just address cards, photos and notes, DropCopy does not allow the user to send address cards or photos from Mobile DropCopy to a Mac. And just as with Fliq application, the user is limited to transferring files only with other DropCopy devices currently on the same network.

Another drawback of the applications is that the process of selecting which users to send a file to may be burdensome using portable devices that have very small screens, such as watches or other wrist-worn devices, which may be less than 40 mm in diameter. Scrolling through a list of available contacts or devices on such a small device, particularly in a crowded WiFi hot spot that may have many devices online, could be time consuming. Another factor to consider is that due to the form factor of small portable devices, a keyboard and button-based user interface integrated with small portable devices is neither practical nor aesthetically pleasing, which may further limit how users are selected and the devices paired.

BRIEF SUMMARY OF THE INVENTION

Methods and systems for transferring an object from a sending device to a recipient comprises determining at least one catching device associated with the recipient for receiving the object; receiving on the sending device a user gesture representing a flick of a displayed object; transferring the object from the sending device directly to the catching device of the recipient when the catching device is in proximity of the sending device; and when the catching device is not in proximity of the sending device, transferring the object to a server for forwarding the object to the recipient.

BRIEF DESCRIPTION OF SEVERAL VIEWS OF THE DRAWINGS

The drawings illustrate the design and utility of embodiments of the invention, in which similar elements are referred to by common reference numerals. In order to better appreciate the embodiments, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION OF THE INVENTION

The present invention relates to improved methods and systems for transferring files between devices. The following description is presented to enable one of ordinary skill in the art to make and use the invention and is provided in the context of a patent application and its requirements. Various modifications to the embodiments and the generic principles and features described herein can be made. Thus, the present invention is not intended to be limited to the embodiments shown, but is to be accorded the widest scope consistent with the principles and features described herein.

In the following description, for purposes of explanation, numerous details are set forth in order to provide a thorough understanding of various embodiments. It is important to note that the invention can be practiced without all of these details. Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
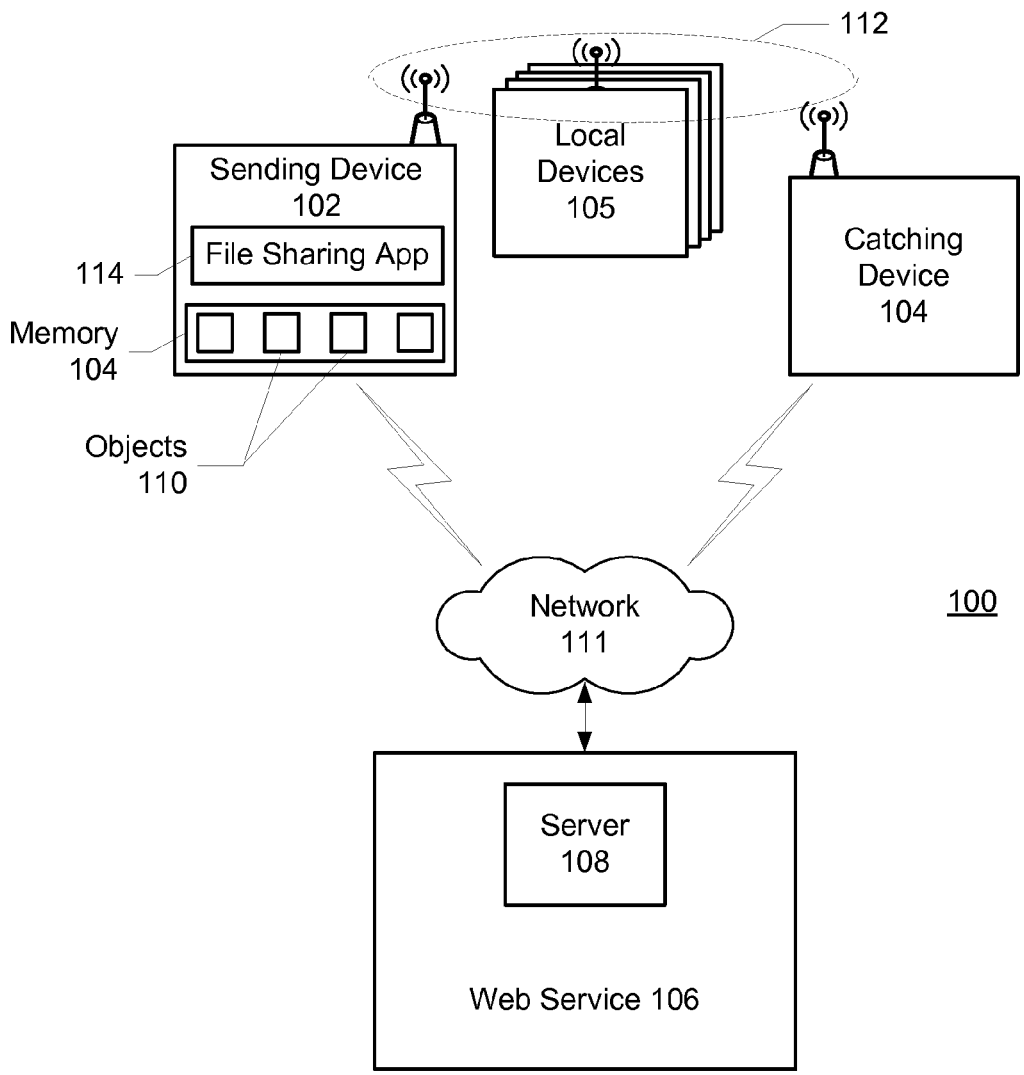
FIG. 1 illustrates a system for implementing file sharing between devices.

FIG. 1 illustrates a system for implementing file sharing between devices. The system 100 may include a sending device 102, at least one recipient's catching device 104, and a file sharing web service 106, which in one embodiment includes a server 108. Both the sending device 102 and the catching device 104 may communicate wirelessly with the web service 106 via network 111 (e.g., the Internet). If the sending device 102 and the catching device 104 are online within the same local network 112, then the sending device 102 may communicate directly with the catching device 104. In this embodiment, other wireless local devices 105 may be available on the same local network 112. The local network 112 may comprise any type of wireless or wired network, such as a WiFi network, a WiMax network, or a wireless personal area network (WPAN), where the WPAN may include IrDA and Bluetooth. In an alternative embodiment, the local network 112 may comprise a wired local area network (LAN).

In one embodiment, the sending device 102 may represent any type of electronic device capable of communicating with a server 108 over a wired or wireless network 111, including a PDA, a cell phone, a game device, a media player, a digital camera, a notebook, and the like. In an exemplary embodiment, the sending device 102 may comprise a wearable portable device, as described with respect to FIGS. 5A, 5B and 6.

The sending device 102 may execute a file sharing application 114 that enables the sending device 102 to share an object(s) 110 with other devices, which may be done by "flicking" the object 110 from the sending device 102 to a recipient's catching device 104. In another embodiment, some or all of the functionality of the file sharing application 114 may be included in an operating system (OS) or another utility of the sending device 102 and/or the file sharing application 114 may comprise multiple components.

In one embodiment, a process is provided for enabling the user of the sending device 102 to quickly indicate to which catching device 104 an object 110 should be transferred. For example, the file sharing application 114 may automatically pair the sending device 102 and the catching device 104 for file sharing when similarly-timed inertial sensor events are detected in both the devices 102 and 104, such as when the devices 102 and 104 are clicked together or through other physical contact. In another embodiment, the sending device 102 may pair with multiple catching devices 104 through the similarly-timed inertial sensor events. In another embodiment, the sending device 102 may pair with one or more of the catching devices 104 specified in a catchers list.

In another aspect of the exemplary embodiment, the web service 106 serves as cloud storage for at least the sending device 102. Objects 110 that are to be shared by the sending device 102 may be stored in the sending device 102, in the web service 106, or both, thereby providing multilevel storage. The objects 410 to be shared may comprise files of any file type, data (including contact data items such as contact cards, to-do lists, notes, and the like), tables, and references to the objects 110, including uniform resource locators (URLs) that point to storage locations of the objects 110 within the sending device 402 or within the web service 406.

In one embodiment, the system 100 may transfer the objects 110 from the sending device 102 to a recipient of the catching device 104 through the web service 106 to facilitate the file sharing with the catching device 104. In this embodiment, the catching device 104 may or may not be the same local network 112 as the sending device 102 and may or may not run the file sharing application 114.

In one embodiment where the sending device 102 includes a touchscreen, the user may initiate a transfer of a displayed object 110 by performing a finger gesture that may represent a flick or swipe, for example. Alternatively, the user may initiate transfer of an object 110 by pressing a soft key or button. In response, the file sharing application 114 causes the object to be transferred, as follows.

If the catching device 104 is within proximity of the sending device 102, then the sending device 102 may transfer the object 110 to the catching device 104, e.g., via the local network 112 (e.g., a WLAN, LAN, or PAN). If the catching device 104 is not within proximity of the sending device 102 or otherwise the sending device 102 cannot send the object the catching device 104, then a copy of the object 110 from the server 108 may be transferred to the recipient's catching device 104.

According to the exemplary embodiments, the file sharing application 114 in conjunction with the web service 106 may enable file sharing with the catcher device 104 when the catching device 104 is on the same local network 112, when the catching device 104 is across multiple networks, and even when the catching devices 104 is not running a copy of the file sharing application 114.

Figure 3:
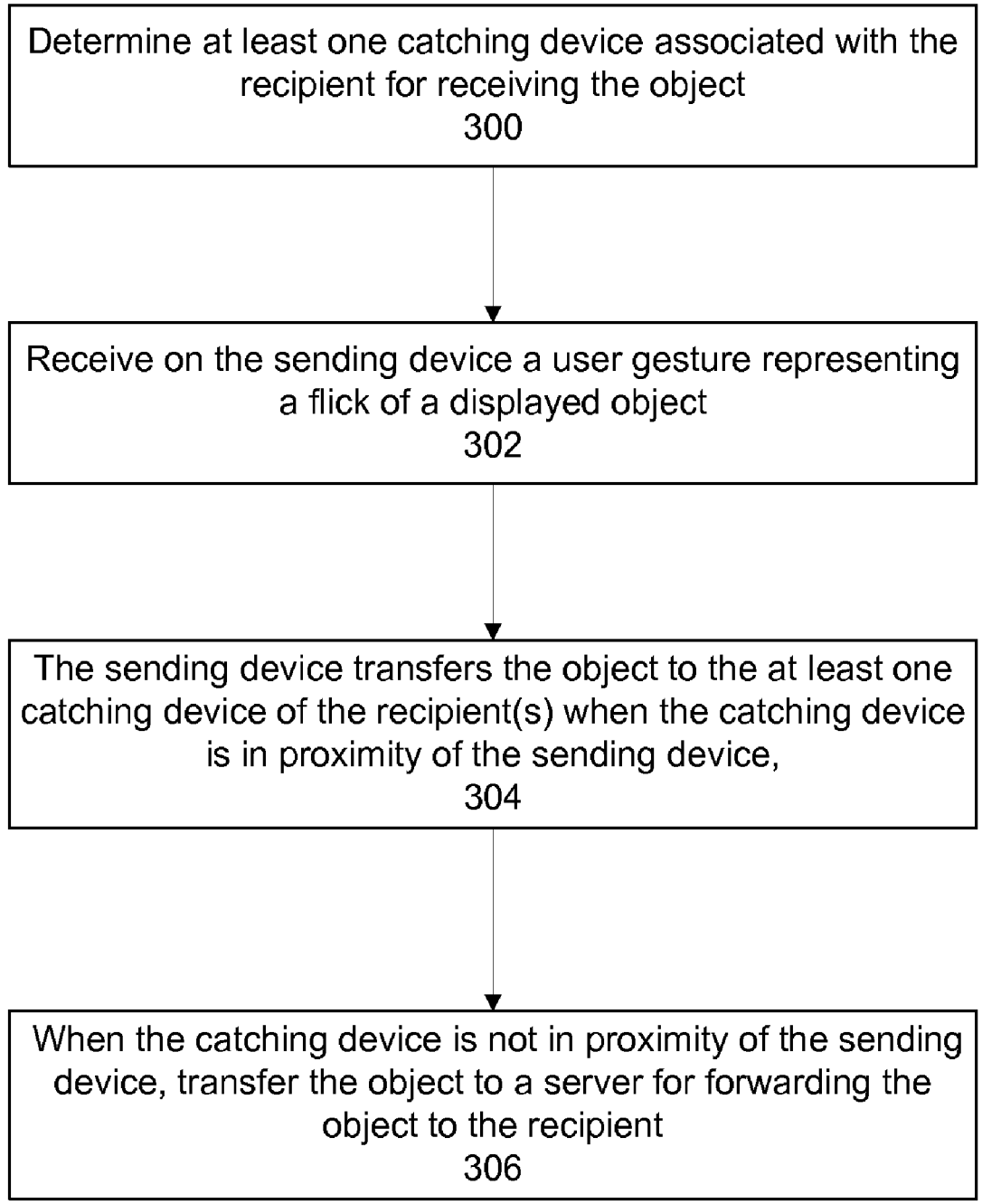
FIG. 3 is a flow diagram illustrating a process for implementing file sharing by flicking an object from a sending device to a recipient's catching device according to one embodiment.

FIG. 3 is a flow diagram illustrating a process for implementing file sharing by flicking an object from a sending device to a recipient's catching device according to one embodiment. In one embodiment, the process is implemented through a combination of the file sharing application 114 and the web service 106. The process includes determining at least one catching device 104 associated with the recipient for receiving the object 110 (block 300).

According to an exemplary embodiment, both the sending device 102 and the catching device 104 are file sharing application 114 enabled and each may include an inertial sensor, such as an accelerometer. In this embodiment, the process of determining the catching device 104 may include automatically pairing the sending device 102 with a catching device 104 when similarly-timed inertial sensor events are detected in both the sending device 102 and one or multiple catching devices 104. The term pairing refers to here as a process of automatically designating a device(s) as a catching device 104 that receives data in response to a transfer initiated from the sending device 102.

Figure 2:
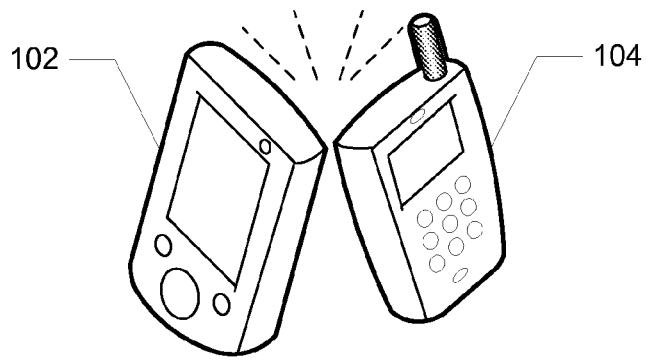
FIG. 2 is a diagram illustrating the clicking together of a sending device and a catching device through physical contact.

Any type of inertial sensor event that is generated through a gesture of a user may be used to automatically pair the sending device 102 and the catching device 104. For example, in one exemplary embodiment, the detection of the similarly-timed inertial sensor event may comprise the sending device 102 and at least one catching device 104 being "clicked" together through physical contact, as shown in FIG. 2.

In one embodiment, the sending device 102 may receive the inertial sensor event timing from local devices 105 (FIG. 1) via wireless communication and determine which one of the local devices 105 is the catching device 104 by matching the timing of the inertial sensor events of the local devices 105 with the timing of its own inertial sensor event.

In another embodiment, the inertial sensor event generated through a user gesture may comprise a substantially simultaneous shaking of the devices 102 and 104. Whereas the clicking together embodiment requires close physical proximity between the sending device 102 and the catching device 104, the shaking embodiment does not require physical proximity between the sending device 102 and one or multiple catching devices 104. For example, users of the sending device 102 and one or more catching devices 104 may be separated by a great distance, yet decide during a telephone conversation to initiate a transfer between the devices 102 and 104 by each user shaking his or her device 102 and 104 at the same time.

As another example of clicking to pair the devices 102 and 104, consider a situation where a user of a wireless-enabled digital camera running the file sharing application 114 wishes to transfer images to another device, such as another camera. To initiate the transfer of images, the digital camera and the other device can be clicked together to pair the devices. Yet other examples of click pairing are two kids clicking their devices before swapping pokemon cards, or exchanging video game weapons or tokens.

In one embodiment, the sending device 102 and the local devices 105 may communicate the timing of the detected inertial sensor events to the server 108. The sending device 102 may then receive from the server 108 a determination of which one or more of the local devices 105 is the catching device 104 based on the timing of the detected inertial sensor events.

In a third embodiment, the local devices 105 may communicate the timing of detected inertial sensor events to the sending device 102, and the sending device 102 forwards the timing of the detected inertial sensor events, including its own, to the server 108. The sending device 102 may then receive from the server 108 a determination of which one or more of the local devices 105 is the catching device 104 based on similarly-timed inertial sensor events.

As stated above, the sending device 102 may maintain a catchers list of possible recipients. The recipients in the catchers list 104 may be listed as device IDs, usernames, email addresses, telephone numbers, or any combination thereof. When a user of the sending device attempts to send or flick an object 110 from any application (including applications created by third party developers), data associated with that object 110 may be sent to all the recipients on the catchers list. For example, a teenager can set up a set of ten friends as recipients or "catchers", and then throughout the day click photos, songs, or messages to those catchers.

In an alternative embodiment, the data associated with the object 110 may be sent only to the one or more catching devices 104 that was most recently paired with the sending device 102. In yet another embodiment, the catchers list may be displayed on the sending device 102 to enable the user to select the recipient(s) manually.

In one embodiment, the catcher's list may be made a system utility of the sending device 102, such that the catchers list is a system-wide, persistent feature that is accessible by applications running on the sending device 102. In this embodiment, third-party software developers would not have to provide their applications with a way for setting up the catchers list. Instead, the user can use a system-level set-up utility to create the catchers list once. As an example, consider the case where a user is viewing photos in a photo application, and flicks some photos. By default, the photos may be sent to the recipients listed in the catchers list or the device to which the sending device was last paired. Now if the user switches to a different application, such as a music sharing application, and starts flicking songs, the songs will be sent to the same recipient(s) in the catchers list without the user having to slow down to specify the recipients, despite the user switching applications.

Recipients may be added to the catchers list in a variety of embodiments. In one embodiment, the catchers list may be populated with users that are most often selected on the sending device 102 from a contact list. The catchers list may also be populated based on local devices 105 detected on the same network by the sending device 102. Similarly, the catchers list may be populated using any combination of global positioning system (GPS) chips in the devices, cell tower triangulation, WiFi positioning, Bluetooth and IrDA to locate possible catching devices 104, e.g., devices of designated friends of the user. In one embodiment, every catching device 104 to which the sending device 102 is paired may be also automatically added to the catchers list.

Referring again to FIG. 3 the process also includes receiving on the sending device 102 a user gesture representing a flick of a displayed object 110 (block 302). According to an exemplary embodiment, receiving the user gesture comprises receiving a single user gesture, such as a flick of a finger or fingers across the touchscreen. In one embodiment, the user gesture representing the flick is configurable by the user through the file sharing application 114 and/or the web service 106, where the user can assign any gesture to the function of initiating a file transfer.

In one embodiment, a software development kit (SDK), which typically refers to a set of development tools, may be made available to enable software developers to create applications to take advantage of the file sharing application 114. The software developers can use the SDK to designate within an application that an object 110 (or data comprising the object) is eligible for flicking by associating the object 110 with a displayed item, such as a file name, a URL, page, for instance. The item displayed on the sending device 102 may be marked with a representation, e.g., an icon or highlighting, on or around the object 110 that indicates to the user that the object is "flickable". In response to receiving the flick gesture on the displayed item, the file sharing application 114 may transmit the object 110 associated with the displayed item.

For example, a developer could write an application for bicyclists that records bike routes. The application could display to an end-user a list of recorded route names, and in response to the user clicking on one of the route names, display a page showing more details about the route. In response to the user performing the "flick" gesture on that page, the file sharing application 114 may send the page containing the route to a friend.

As another example, a developer could write a music player application that displays pages of song descriptions, where both the pages and the song IDs are designated as flickable, and that allows the user to flick the pages as well as individual songs to friends. When a song ID is flicked to the friend's catching device 114, the same music player application running on the catching device 104 may use the song ID to fetch the corresponding music file and song information, without the need for the sending device 102 to send the entire song.

Referring still to FIG. 3, after the sending device 102 receives the flicking gesture, the process further includes transferring the object 410 from the sending device 102 directly to at least one catching device 104 of the recipient(s) (block 304). In block 304, the sending device 102 may transfer the object 102 to multiple catching devices 104 corresponding to multiple recipients. The determination of whether each catching device 104 is in proximity to the sending device 102 may be made using any combination of GPS, cell tower triangulation, WiFi positioning, or by establishing communication via Bluetooth or IrDA. A connection for the transfer may be established between the sending device 102 and each catching device 104 using a variety of WAN and PAN technologies, including WiFi, Bluetooth, IrDA, and the like.

When the catching device 104 is not in proximity to the sending device 102, the object 110 is transferred to the server 108 for forwarding the object 110 to the recipient (block 306). In one embodiment, the object 110 may be sent to the server 108 prior to the sending device 102 receiving the gesture representing a flick, e.g., when the object is loaded onto the sending device 102 or when the object is only stored on the server 108. In another embodiment, the sending device 102 may transfer the object to the server 108 in response to receiving the gesture representing the flick.

In the embodiment where the sending device 102 sends the object 110 to the server 108 for forwarding, delays may be minimized by the following approach. When an object 110 is initially loaded onto the sending device 102, e.g., from a user's PC, the file sharing application 114 (or a PC component of the file sharing application) may automatically upload the object 110 to the server 108 and a reference is created to that object 110 and stored on the sending device 102. A short summary of the object's contents and properties may also be stored on the sending device 102. When the user flicks the object from the sending device 102 to the recipient's catching device 104, the file sharing application 114 may send only the reference and optionally the summary to the catching device 104. Since only the reference and summary are sent, the transfer may be significantly faster than transferring the object.

In one embodiment, when the reference is received on the catching device 104, the user of the catching device 104 may click on the reference (e.g., a URL) to cause the object 110 to be retrieved from the server 108 and downloaded to the catching device 104. In an alternative embodiment, the server 108 may automatically transfer or push the object 110 to the catching device 104. A prompt may be displayed on the catching device 104 asking the recipient to accept the download of a large object.

The server 108 may transfer the object 310 to the catching device 104 using a variety of electronic transmission methods, including a file transfer protocol (FTP), e-mail, text messaging, faxing, and the like, thereby enabling the flicking of objects between devices of different types, makes and models. Likewise, when the catching device 104 is on the same local network 112 of the sending device 102 and thus may be in proximity, but does not run the file sharing application 114, the sending device 102 may transfer the object to the catching device 104 using the same alternative techniques, such e-mailing, texting, and instant messaging.

In one embodiment, the sending device 102 may determine when to send the object 110 to the catching device 104 and/or to the server 108 based on a size of the object 110 and a connection status between the sending device 102 and the catching device 104 and/or the server 108. For example, although the sending device 102 may determine the catching device 104 is in proximity, the sending device 102 may nonetheless transfer the object to the server if the size of the object 110 exceeds a size threshold or if the connection is too slow or nonexistent. As another example, if the object 110 is a large file and the connection between the sending device 102 and the server 108 is slow or nonexistent, then transmission of the object 310 to the server 108 may be delayed.

Similarly, the server 108 may determine when to forward the object 110 to a catching device 104 of the recipient based on a size of the object 110 and the connection status between the server 108 and the catching device 104. For example, if the catching device 104 is offline, the server 108 could delay the transmission of the object 110 until the catching device 104 comes back online. In the embodiment where the sending device 102 sends a reference to the object 1102 the catching device 104, but the object 110 has not yet been downloaded from the server 108 to the catching device 104, then a message may be displayed on the catching device 104 that the object has not yet been received.

According to the file sharing of the exemplary embodiment, gesture-based file sharing is no longer limited to a WiFi network and does not need to be form factor, software provider, or manufacturer dependent. A combination of the file sharing application 114 and the web service 106 enables any type of file or reference to be sent from the sending device 102 to any type of device, locally or across multiple networks. Such a file sharing process may be the shortest method of sending an object 110 from one user to another. Only a single finger gesture on the touchscreen is required, and the catching device can be identified automatically by a simultaneous click or tap of the sending and catching devices, eliminating the need for buttons.

Figure 4:
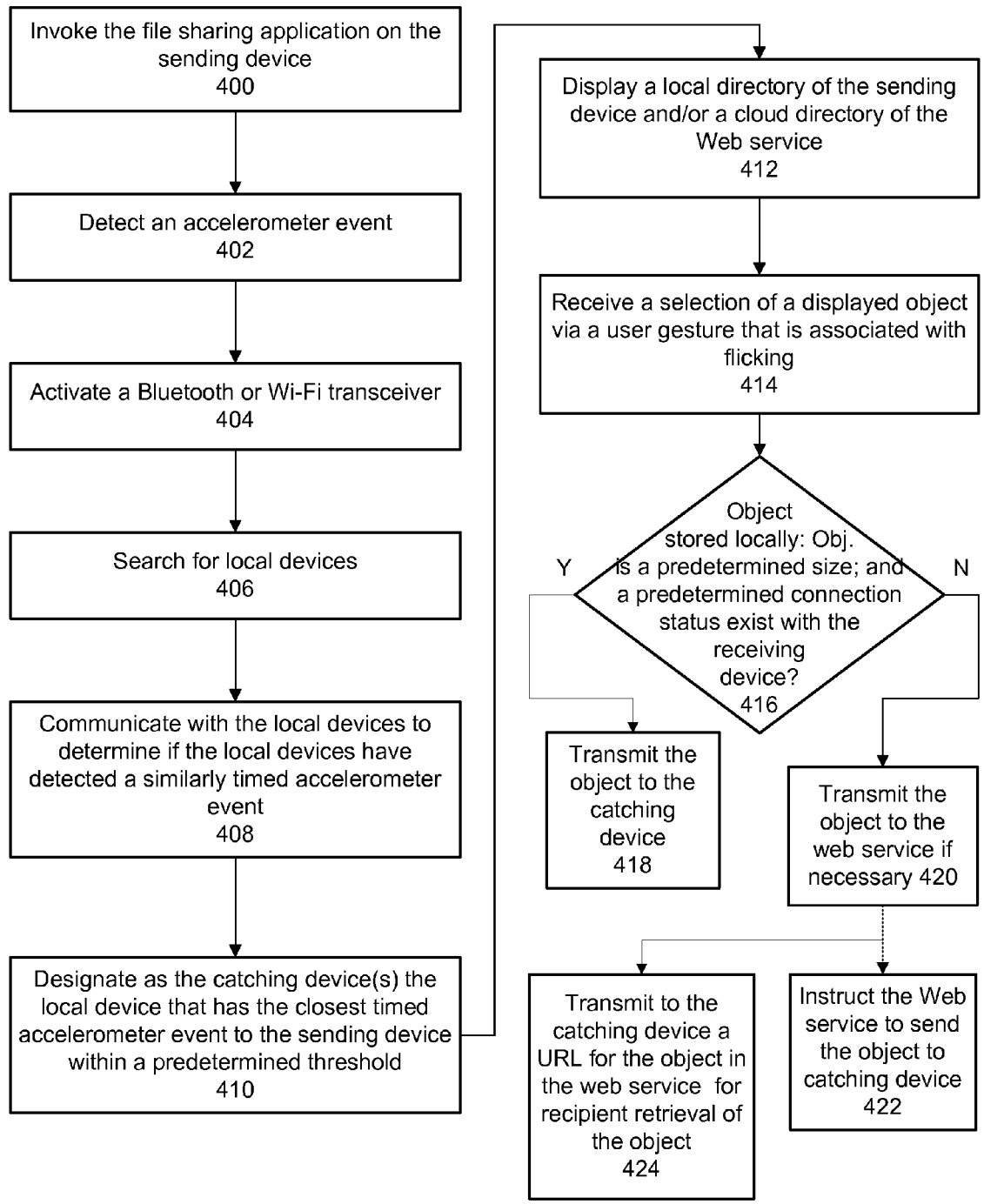
FIG. 4 is a flow diagram illustrating the file sharing process in further detail in accordance with an exemplary embodiment.

FIG. 4 is a flow diagram illustrating the clicking process in further detail in accordance with an exemplary embodiment. The process may include invoking the file sharing application 114 on the sending device 102 (block 400). The file sharing application 114 detects an accelerometer event (block 402). If required, the file sharing application 114 activates a Bluetooth or WiFi transceiver (block 404), and searches for other local devices 105 (block 406). The file sharing application 114 communicates with the local devices 105 to determine if the local devices 105 have detected a similarly-timed accelerometer event (block 408). The file sharing application 114 designates as the catching device(s) 104 the local device 105 that has the closest timed accelerometer event to the sending device 102 within a predetermined threshold, and optionally adds the catching device 104 to the catchers list (block 410). Although the embodiment of FIG. 4 is described in terms of a single catching device 104, it should be understood that the process may designate multiple catching devices 104.

In one embodiment, the designation of the catching device 104 is performed automatically by the file sharing application 114 via clicking with another local device 105, resulting in the creation of temporary communication path between the sending device 102 and the catching device 104. In one embodiment, once a temporary communication path is established between the sending device 102 and the designated catching device 104, each device may vibrate or play a sound and briefly display a message indicating that the respective device is connected to the other device.

In another embodiment, the designation of the catching device 104 is performed manually after the user selects a recipient from the catchers list. In this embodiment, the catching device 104 does not need to be within the local wireless network 112. In one embodiment, to facilitate population of the catchers list, all the local devices 105 found via block 606 may be added to the catchers list. The type of designation of the catching device 104, automatic, or manual, may be configurable by the user. In one embodiment, the catching device 104 may optionally add the sending device 102 to its catchers list as well. The sending device 102, the catching device 104, or both, may also optionally register their catchers list with the web service 106.

The file sharing application 114 may display on the sending device 102 a local directory of the sending device 102 and/or a cloud directory of the web service 106 so the user may select the object 110 to send to the catching device 104 (block 412). In one embodiment, objects 110 that are eligible for flicking may be displayed with a "flick it" icon or highlighting indicating that the object is flickable. In one embodiment, the file system application 114 may suggest objects 110 to flick based on the location in the displayed directory the user is navigating. The file sharing application 114 receives a selection of a displayed object 110 via a user gesture that is associated with flicking, such as a swipe of a finger from the displayed object 110 across the touchscreen (block 414).

It should be understood that blocks 412 and 414 may be performed prior to detection of an accelerometer event (block 402). Or as described above, block 414 may result in the sending device automatically sending the flicked object to all recipients in the catchers list.

The file sharing application 114 determines whether the object 110 is stored locally, whether the object meets a predetermined size restriction (e.g., less than 1 MB), and whether a wireless connection with the catching device 104 exists that meets a predetermined status, e.g., greater than a particular speed and/or signal strength (block 416). If each of these conditions is met, then the sending device 102 transmits the object 110 to the catching device 104 (block 418).

If any of the conditions are not met, then the file sharing application 114 transmits the object 110 to the web service 106 if the object is not already stored there (block 420).

In one embodiment, the file sharing application 114 may instruct the web service 106 to send the object 110 to the sending device 102 via an automatic transfer (block 422). Once the catching device 104 receives the object 110, a message, for example, may be displayed on the catching device 104 indicating receipt of a flicked object and prompting the user to accept or decline the flicked object. Alternatively, the file sharing application 114 may transmit to the catching device 104 a URL of the storage location of the object 110 in the web service 106 for recipient retrieval of the object (block 424). The user of the catching device can then click on the URL to download the object from the server 108.

Figure 5A:
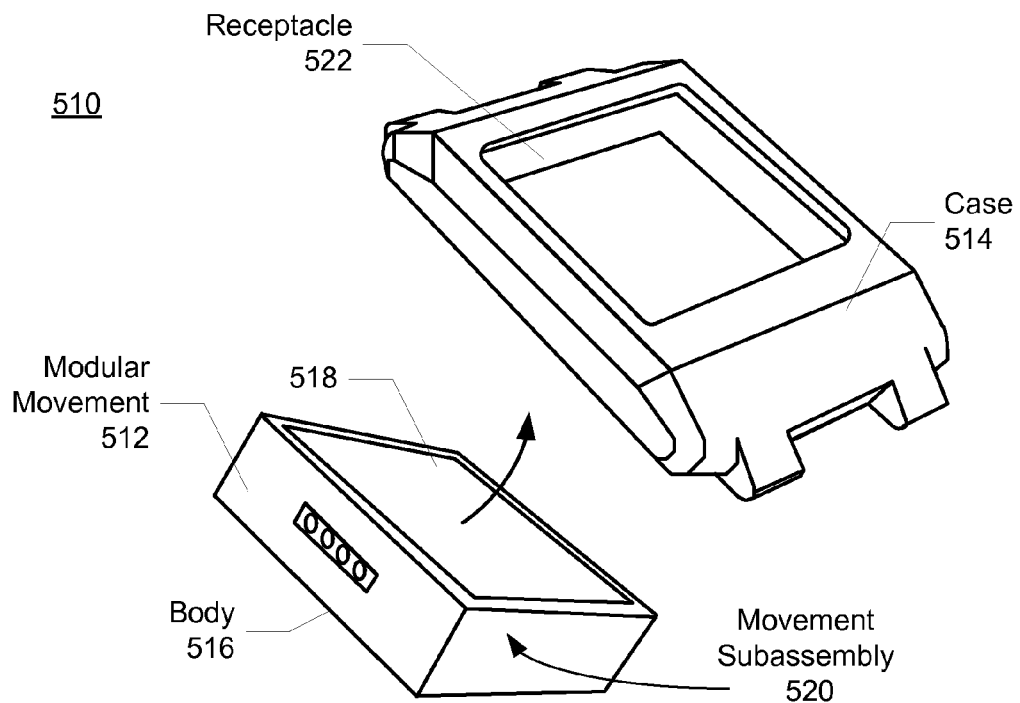
FIGS. 5A and 5B are block diagrams illustrating exemplary embodiments of a portable device incorporating the file sharing application.
Figure 5B:
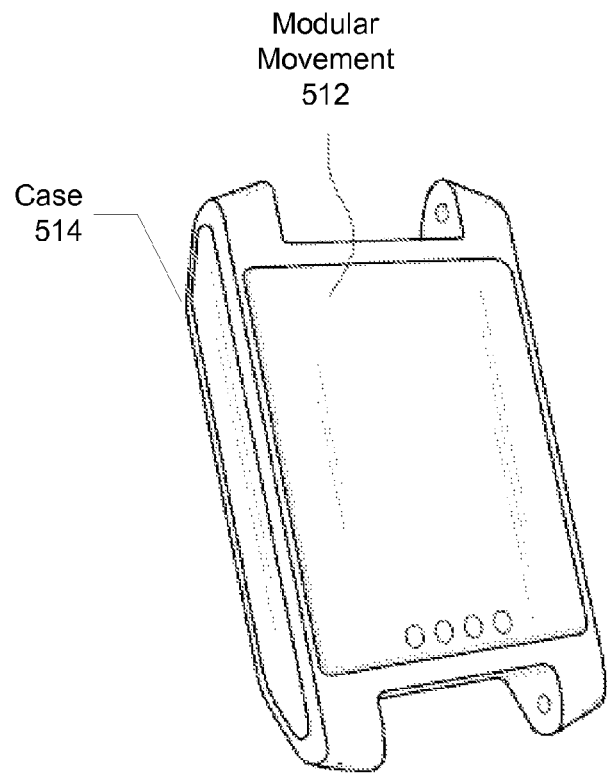

FIGS. 5A and 5B are block diagrams illustrating exemplary embodiments of a portable device 510 incorporating the file sharing application 114, as described above. The portable device 510 can be wearable, for example, on a user's wrist, upper arm, and/or leg, or may be attached to the user's clothing, and may have the functions of a wristwatch, a wearable display, a portable media player, and/or a mobile telephone in various embodiments. According to the exemplary embodiments, the portable device 510 may comprise a modular movement 512 (the "module") and a case 514. The module 512 includes a body 516 that houses a plurality of layers, including an integrated display 618 (including a touchscreen) and a movement subassembly 520, for displaying information, including time. FIG. 5A is a diagram of module 512 shown with a semitransparent body 516 for convenience so that subassembly 520 can be seen through body 516.

As used herein, the term "modular" means that the body 516 of the module 512 includes all parts necessary for operation and power of the module 512. Thus, the module 512 of the exemplary embodiment is fully functional in a standalone state. However, according to the exemplary embodiment, the case 514 of the portable device 510 includes a receptacle 522 for removably receiving the module 512 without need for a tool, such that the module 512 can be either used with the case 514 of the portable device 510 and/or is user interchangeable with the cases of other electronic devices having the same or similar types of receptacles.

The portable device 510 is shown as a wristwatch; however, various embodiments of the invention include other accessory forms. For example, some embodiments include other accessories with mounts for the module 512, such as mobile phones, computer bays, automobile mounts (e.g., dashboard mount, console mount), handheld games, media players (e.g., MP3 players), necklaces, brooches, belts, keyboards, cameras, bicycles, key chains, video cameras, speaker platforms, and ankle bracelets. In an alternative embodiment, the portable device 510 may be implemented as a stand-alone device, such as a cell phone, where the functions of module 512 including components of the below-described file sharing, are integrated into the stand-alone device.

In one exemplary embodiment, the module 512 and the receptacle 522 in the case 514 are made standard industry sizes, such that different modules 512 manufactured and sold by one set of manufacturers fit within the receptacles of different cases manufactured and sold by another set of manufacturers, for example.

FIGS. 5A and 5B show an embodiment where the receptacle 522 is formed as an opening in the back of the case 514 and where the top or front of the case 514 includes an opening. In this embodiment, the module 512 is inserted into the case 514 from the bottom or back of the case 514, and once inserted the display 618 of the module is visible through the opening in the top of the case 514. When the module 512 is used in a portable device 510, such as a watch, the display 618 of the module 512 becomes the display 618 of the portable device.

The display 618 can include a display assembly including a color LCD display, a glass overlay and a touch-sensitive overlay. The display 618 may form the top of the portable device 510 in an exemplary embodiment. In some embodiments, the display includes an active viewable area of 25.4 (H)×25.4 (V) mm, with a display resolution between approximately 128 (H)×128 (V) and 200 (H)×200 (W) pixels. Other embodiments include other display resolutions. In some embodiments the display 618 has an active area that measures less than 2.5" diagonally (in other embodiments, less than 2" diagonally).

As used herein, the portable device 510 may include a combination of both the case 514 and the module 512. But the term "case" 14 may denote the body of the portable device 510 into which the receptacle 522 is formed and into which the module 512 is to be inserted. According to another exemplary embodiment, the module 512 may be implemented as a computer-based electronic movement that is used to power the portable devices into which it is inserted.

Figure 6:
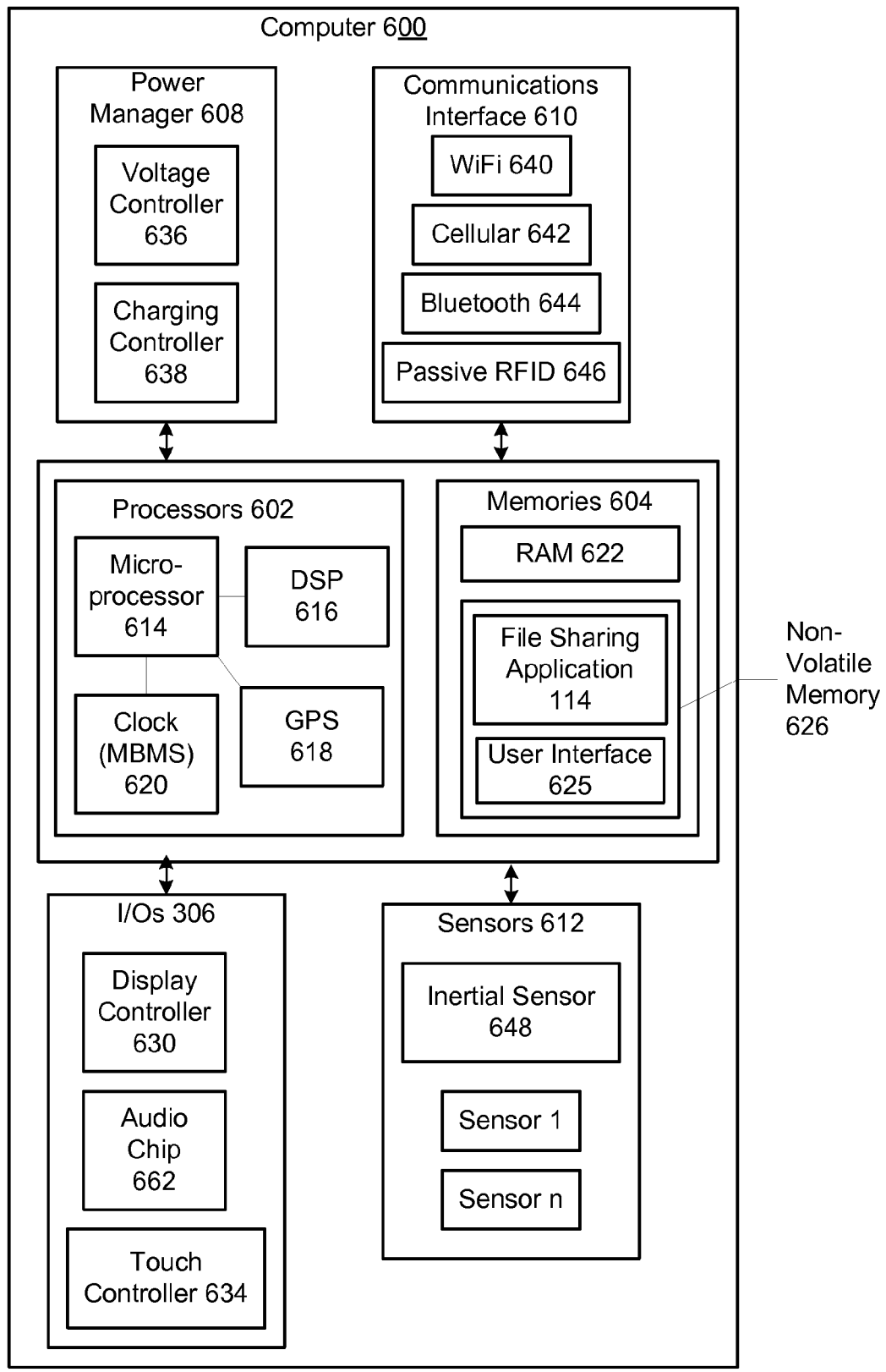
FIG. 6 is a block diagram illustrating computer components comprising the module according to an exemplary embodiment.

FIG. 6 is a block diagram illustrating computer components comprising the module 512 according to an exemplary embodiment. Computer 600 may include components such as processors 602, memories 604, inputs/outputs 606, power manager 608, a communications interface 610, and sensors 612. In one embodiment, one or more of the components of the computer 600 may be implemented on a single chip.

The processors 602 may include at least one microprocessor 614, a digital signal processor (DSP) 616, a global positioning system (GPS) chip 618, and a clock 620. Microprocessor 614 and/or DSP may be capable of concurrently executing multiple software routines, including system code, to control the various processes of the modular movement 512. In one embodiment, microprocessor 614 may comprise an Advanced RISC Machine (ARM) processor or the like may be used, for example. GPS chip 618 may process received satellite signals and with or without microprocessor 614 determine position information such as location, speed, direction, and time.

Clock 620 may be used as an internal timing device for the computer 600. Clock 620, which may also be referred to as a real-time clock or system clock, inputs to the microprocessor 614 a constant flow of timing pulses for operation of the microprocessor 614. Clock 620 may also keep track of the time of day and makes this data available to the software routines executing in microprocessor 614. In one embodiment, clock 620 comprises a silicon oscillator clock implemented using micro-electro-mechanical systems (MEMS) technology. In another embodiment, clock 620 may utilize a quartz crystal oscillator.

Memories 604 may include a random access memory (RAM) 622 and a nonvolatile memory 626. RAM 622 may be used as the main memory for microprocessor 614 for supporting execution of the software routines and other selective storage functions. Non-volatile memory 626 is capable of holding instructions and data without power and may store the software routines for controlling the modular movement 512 in the form of computer-readable program instructions. In one embodiment, non-volatile memory 626 comprises flash memory. In alternative embodiments, non-volatile memory 626 may comprise any type of read only memory (ROM).

The non-volatile memory 626 may contain software applications, including the file sharing application 114 and a user interface 625. The user interface 625 can provide functionality for the portable device 510 and can output a graphical user interface on the display 618. The user interface 625 can access a gesture store (not shown), which can contain definitions of different gestures in the form of combinations of sensor inputs, defined as gesture rules, and predetermined functions associated with the gestures that are executed upon identification of the gestures. When executed, the user interface 625 can access the gesture rules stored in gesture store when movement of the portable device 510 is sensed. When the movement satisfies the rules in a gesture definition, the predetermined function may be executed.

I/Os 606 may include a display controller 630, an audio chip 632, and a touchscreen controller 634. Display controller 630 may access RAM 622 and transfer processed data, such as time and date and/or a user interface, to the touchscreen for display. The audio chip 632 is coupled to an optional speaker (not shown) and interfaces with microprocessor 614 to provide audio capability for the modular movement 512. In another embodiment, the audio chip 632 may be coupled to both a speaker and a microphone (not shown). In this embodiment, a water resistant/proof speaker and microphone may be used to retain water resistance of the modular movement 512. In an alternative embodiment, the modular movement 512 may be implemented without sound capability, in which case no audio chip 632, speaker or microphone is necessary.

In the embodiment where the audio chip 632 is coupled to both a speaker and a microphone, the microphone may record voice input that is first processed by the audio chip and then input to the microprocessor 614 for further processing. The audio chip 632 may include hardware and/or software that converts analog voice into pulse code modulation (PCM) or Adaptive Differential PCM (ADPCM) digital code and vice versa, as well as for compressing and decompressing the PCM or ADPCM digital audio signal. In one embodiment, the processed voice input may be stored for subsequent playback. In another embodiment, the processed voice input may be transferred to communications interface 610 for wireless transmission.

Touchscreen controller 634 may interface with the touchscreen to detect touches and touch locations and pass the information on to microprocessor 614 for determination of user interactions. Another example I/O 606 may include a USB controller (not shown).

Power manager 608 communicates with the microprocessor 614 and coordinates power management for the computer 600 while the computer is drawing power from a battery (not shown) during normal operations. In one embodiment, the battery may comprise a rechargeable, lithium ion battery or the like may be used, for example. The power manager 608 includes a voltage controller 636 and a charging controller 638 for recharging the battery. Voltage controller 636 may regulate battery voltage to the rest of the computer 600, and charging controller 638 may manage appropriate voltage levels to properly charge the battery. Power manager 608 may further include a microcontroller (not shown) in one embodiment.

The communications interface 610 may include components for supporting one-way or two-way wireless communications. In one embodiment, the communications interface 610 is for primarily receiving data remotely, including streaming data, which is displayed and updated on the touchscreen. However, in an alternative embodiment, besides transmitting data, the communication interface 610 could also support voice transmission. In an exemplary embodiment, the communications interface 610 supports low and intermediate power radio frequency (RF) communications. The communications interface 610 may include one or more of a WiFi transceiver 640 for supporting communication with a WiFi network, including wireless local area networks (WLAN), and WiMAX; a cellular transceiver 642 for supporting communication with a cellular network; a Bluetooth transceiver 644 for low-power communication according to the Bluetooth protocol and the like, such as wireless personal area networks (WPANs); and a passive radio-frequency identification (RFID) component 646. Other wireless options may include baseband and infrared, for example. The communications interface 610 may also include other types of communications devices (not shown) besides wireless, such as serial communications via contacts and/or USB communications, for example.

The sensors 612 are representative of devices that can take information about the outside world and supply it to the device 510. The sensors 612 can also function with other components to provide user or environmental input and feedback to a user. Sensors 612 may include at least one of each of an inertial sensor 648, and any number of optional sensors 1-*n*. Inertial sensor 648 can include a MEMS accelerometer (e.g., a 3-axis accelerometer from ST Microelectronics LIS302DL) that may be used to measure information such as position, motion, tilt, shock, and vibration for use by microprocessor 614. A MEMS inertial sensor may be advantageous because it may be fabricated in a very small size (e.g., 5×5×1 millimeters), consume very little power, and still be sensitive to gestures. Another example of an inertial sensor includes a gyroscope to provide information about movement of the portable device 510.

In an exemplary embodiment, the inertial sensor 648 may be designed to have a sensitivity appropriate to detect gestures that fall within a normal range of human motions. For example, a +/−2 g or +/−3 g inertial sensor, with a bandwidth of 0.1 Hz-10 Hz, may be used to provide a desired level of sensitivity. Exemplary commercially available inertial sensors include inertial sensors marketed by Freescale Semiconductor, Inc. of Austin, Tex., Analog Devices, Inc. of Cambridge, Mass., and ST Microelectronics N.V. of Geneva, Switzerland. The inertial sensor 648 may output a voltage signal whose magnitude is proportional to the movement sensed in an exemplary embodiment. In some embodiments, a different voltage signal may be output for each degree of freedom possessed by the inertial sensor 648. For example, if the inertial sensor 648 is a three-axis accelerometer, the inertial sensor 648 may output three voltage signals that correspond to the sensed motion in the X, Y, and Z axes. The inertial sensor 648 may also include a gyroscope, which may detect angular motion, and output three voltage signals corresponding to sensed angular motion in the $\phi$, $\theta$, and $\psi$ directions.

The optional sensors 1-*n* may include environmental sensors (e.g., ambient light (e.g., TPS851 from Toshiba), temperature, humidity, pressure and/or altitude, magnetic (e.g., Hall Effect), compass, etc), biological sensors (e.g., pulse, pulse oximetry, body temperature, blood pressure, body fat, etc.), and a proximity detector for detecting the proximity of objects. Other examples of sensors include touch screen sensors, haptic sensors, and audio input. In the embodiment where the display 618 comprises a touch screen, the touch screen can be capacitance and/or resistance based, or any other touch sensitive device that provides user touch information. In one embodiment, the proximity detector may be implemented as an infrared data Association (IRDA) proximity detector. The computer 600 may display the information measured from the sensors 612, analyze the information by microprocessor 614 and display the analyzed information, and/or transmit the raw or analyzed information via the communications interface 610.

In one exemplary embodiment, the computer 600 includes an inertial sensor 648, which may be a MEMS accelerometer (or other inertial sensor capable of motion tracking in at least two dimensions such as a gyroscope), an ambient light sensor, and a proximity sensor, such as an infrared sensor.

A method and system for file sharing between devices has been disclosed. The present invention described in accordance with the embodiments shown, and there could be variations to the embodiments, and any variations would be within the scope of the present invention. For example, the present invention can be implemented using hardware, software, a computer readable medium containing program instructions, or a combination thereof. Software written according to the present invention is to be either stored in some form of computer-readable medium such as memory or CD-ROM, and is to be executed by a processor. Accordingly, many modifications may be made without departing from the scope of the appended claims.

We claim:

1. A method for transferring an object from a sending device to a recipient, comprising:
    determining which one of a plurality of wireless devices is a catching device associated with the recipient for receiving the object from the sending device, wherein the plurality of the wireless devices are not in physical proximity to the sending device, and wherein the determining includes:
        both the sending device and the plurality of the wireless devices communicating timing of detected inertial sensor events to a server for determining which one of the plurality of the wireless devices is the catching device, wherein the inertial sensor events comprise a respective shaking or physical contact to each of the sending device and the catching device,
        the sending device receiving from the server a determination of which one of the plurality of the wireless devices is the catching device based on the similarly-timed inertial sensor events;
    receiving on the sending device a user gesture representing a flick of a displayed object that is associated with the object for selection of the object;
    transferring the object to the server; and
    transferring the object or a reference to the object from the server to the catching device.

2. The method of claim 1 further comprising:
    designating within an application that the object is eligible for flicking by associating the object with a displayed item; marking the displayed item with a representation indicating to the user that the object is flickable; and in response to receiving the user gesture representing the flick on the displayed item, transferring the object associated with the displayed item.

3. The method of claim 1 further comprising maintaining a catchers list of recipients, wherein the catchers list is a system level utility of the sending device, such that the catchers list is a persistent feature that is accessible by applications running on the sending device.

4. The method of claim 3 further comprising generating a catchers list possible recipients on the sending device using at least one of global positioning system (GPS) chips, cell tower triangulation, Wi-Fi positioning, Bluetooth, and IrDA to locate possible catching devices.

5. The method of claim 1 wherein the user gesture representing the flick is configurable, the method further comprising receiving a user configuration of the user gesture representing the flick.

6. The method of claim 1 wherein the server determines when to forward the object to the catching device of the recipient based on a size of the object and a connection status between the server and the catching device.

7. A portable device, comprising:
an inertial sensor;
a display;
a processor; and
a file sharing application executing on the processor, wherein the file sharing application is configured to:
determine which one of a plurality of wireless devices is a catching device associated with a recipient for receiving an object from the portable device, wherein the plurality of the wireless devices are not in physical proximity to the portable device, wherein the determining includes:
both the portable device and at least one of the plurality of the wireless devices communicating timing of detected inertial sensor events to a server for determining which one of the plurality of the wireless devices is the catching device, wherein the inertial sensor events comprise a respective shaking or physical contact to each of the portable device and the catching device,
the portable device receiving from the server a determination of which one of the plurality of the wireless devices is the catching device based on the similarly-timed inertial sensor events;
receive a user gesture representing a flick of a displayed object that is associated with the object for selection of the object;
transfer the object to the server; and
transfer the object or a reference to the object from the server to the catching device.

8. The portable device of claim 7 wherein the portable device comprises a wearable portable device.

9. The portable device of claim 7 further comprising an application that designates the object as being eligible for flicking by associating the object with a displayed item; marks the displayed item with a representation indicating to user that the object is flickable; and in response to receiving the user gesture representing the flick on the displayed item, transfers the object associated with the display the item.

10. The portable device of claim 7 wherein a catchers list of recipients is maintained, wherein the catchers list is a system level utility of the portable device, such that the catchers list is a persistent feature that is accessible by applications running on the portable device.

11. The portable device of claim 10 wherein the portable device generates the catchers list of possible recipients using at least one of global positioning system (GPS) chips, cell tower triangulation, Wi-Fi positioning, Bluetooth, and IrDA to locate possible catching devices.

12. The portable device of claim 7 wherein the user gesture representing the flick is configurable, wherein the portable device receives a user configuration of the user gesture representing the flick.

13. The portable device of claim 7 wherein the server determines when to forward the object to the catching device of the recipient based on a size of the object and a connection status between the server and the catching device.

14. A wearable portable device, comprising:
a case; and
a module, wherein the module is configured to be removably received by the case and comprises:
an inertial sensor
a touchscreen display; and
a processor, wherein the processor is programmed to:
determine which one of a plurality of wireless devices is a catching device associated with a recipient for receiving an object from the wearable portable device, wherein the plurality of the wireless devices are not in physical proximity to the portable device, wherein the determining includes:
both the wearable portable device and the plurality of the wireless devices communicating timing of detected inertial sensor events to a server for determining which one of the plurality of the wireless devices is the catching device, wherein the inertial sensor events comprise a respective shaking or physical contact to each of the wearable portable device and the catching device,
the wearable portable device receiving from the server a determination of which one of the plurality of the wireless devices is the catching device based on the similarly-timed inertial sensor events;
receive via the touchscreen display a user gesture representing a flick of a displayed object that is associated with the object for selection of the object;
transfer the object to the server; and
transfer the object or a reference to the object from the server to the catching device.

* * * * *